United States Patent

[11] 3,607,321

| [72] | Inventors | Hyosuke Yokota<br>Yokohama-shi;<br>Saburo Nakajima, Kawasaki-shi, both of Japan |
|---|---|---|
| [21] | Appl. No. | 547,574 |
| [22] | Filed | May 4, 1966 |
| [45] | Patented | Sept. 21, 1971 |
| [73] | Assignee | Tokyo Shibaura Electric Co., Ltd.<br>Kawasaki-shi, Japan |
| [32] | Priority | May 12, 1965, May 14, 1965 |
| [33] | | Japan |
| [31] | | 40/27328 and 40/27964 |

[54] GLASS MATERIALS FOR SILVER-ACTIVATED PHOSPHATE GLASS DOSIMETER
6 Claims, 3 Drawing Figs.

[52] U.S. Cl. .................................................. 106/47, 250/83
[51] Int. Cl. ................................................... C03c 3/16, C03c 3/24
[50] Field of Search .......................................... 106/47; 250/83 CD

[56] References Cited

UNITED STATES PATENTS

| 2,999,819 | 9/1961 | Blair ............................ | 106/47 X |
| 3,118,788 | 1/1964 | Hensler ........................ | 106/47 X |
| 3,294,700 | 12/1966 | Bedier et al. ................. | 106/47 X |

FOREIGN PATENTS

| 974,157 | 11/1964 | Great Britain ................ | 106/47 |

*Primary Examiner*—Helen M. McCarthy
*Attorney*—Stephen H. Frishauf

ABSTRACT: A dosimeter glass material exhibiting good durability against weathering, good workability, high sensitivity, low predose and low fading characteristics is comprised of from 40 to 55 parts by weight of lithium metaphosphate and complementarily, from 60 to 45 parts by weight of aluminum metaphosphate and from 2 to 11% of silver metaphosphate based on the combined weight of said lithium and aluminum metaphosphates.

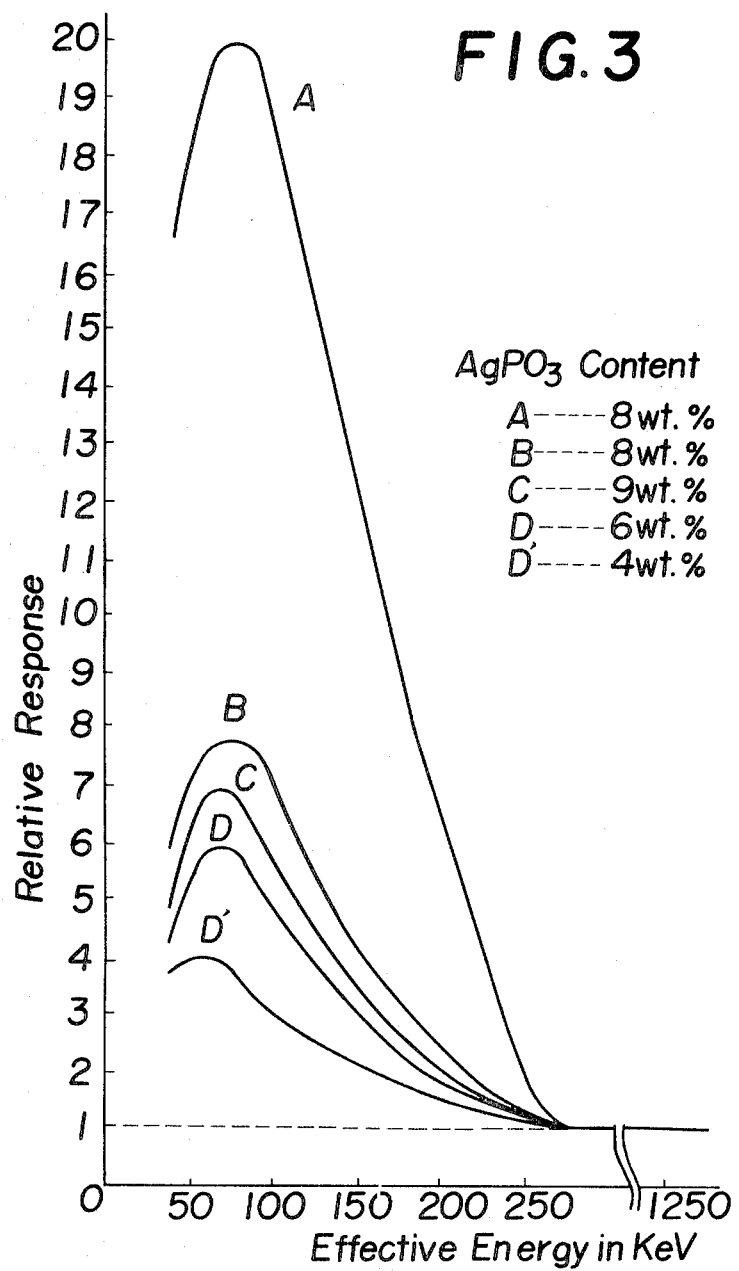

GLASS MATERIALS FOR SILVER-ACTIVATED PHOSPHATE GLASS DOSIMETER

This invention relates to glass materials for a silver-activated phosphate glass dosimeter, and more particularly, to glass materials which can be more readily prepared than well known materials and yet have characteristics desirable for use in dosimetry.

Below are various desirable radiation dosimetric characteristics of the dosimeter glass piece of silver-activated phosphate:

1. The sensitivity of the glass piece for radiations, or the intensity of fluorescence of the glass piece caused by a unit exposure dose, should be high.
2. The predose of the glass piece, or the original amount of flurorescence before exposure to radiation, should be low when it is converted into the quantity of dose.
3. The energy dependency, or the variation in the relative response of the glass piece with respect to the variation in the effective energy Kev. of the radiation, should be as small as possible.
4. The time of buildup, or the time interval required for the fluorescence to reach a saturated value when the glass piece is irradiated by any radiation dose, such as by ultraviolet rays, should be short.
5. The fading of the fluorescence ability of the exposed glass piece should be as low as possible; i.e., the phenomenon that after the fluorescence caused by the above-mentioned stimulation by ultraviolet rays has reached the saturated value, the intensity of fluorescence gradually decreases with time during storage of the glass piece or while the glass piece is being mounted on a human body. This rate of decrease of fluorescence should be as small as possible,.

Further, other desired properties for the dosimeter glass of silver-activated phosphate are good durability against weathering and good workability. Thus, for example, for the cubic-type of glass workability. having dimensions of 8 mm. × 8 mm. × 4.7 mm. or plate-type glass pieces having comparable volumes which are generally utilized for military or civil defense purposes or as a personnel monitoring dosimeter for workers engaged in the radiation field, it is highly desirable that these glass pieces have good weather durability so that they may be used over a long period of time, for example, 3 or 6 months or even 1 year. When preparing a glass piece of the small rod-type, for example, 1 mm. diameter and 6 mm. long, for use in radiology or in radiothereary, the glass should have good workability so that it can be readily formed without accompanying devitrification.

Among the presently known badge glasses for silver-activated phosphate glass dosimeters are the following two types developed by J. H. Schulman et al. One of these is prepared by adding 8 parts by weight of silver metaphosphate $AgPO_3$ to a total of 100 parts by weight comprising 25 parts of potassium metaphosphate $KPO_3$, 25 parts of barium metaphosphate $Ba(PO_3)_2$ and 50 parts of aluminum metaphosphate $Al(PO_3)_3$, and then melting the mixture. The dosimeter glass pieces made from this molten mixture have been widely used in military as well as civil defense fields, but their resistance to weathering is poor. More specifically, for the purpose of measuring the durability for weathering, 2 grams of crushed glass having a particle size of about 40 to 60 Tayler mesh was taken and was put into a conical flask of 300 cc. capacity together with 50 cc. of water. After boiling for 2 hours at the temperature of 100°C., the the quantity of sodium ion $K^+$dissolved in the water was measured by the flame analysis method. The result of this analysis showed that the measured value for said glass material was 50 p.p.m. Hereinafter, this glass will be referred to as "A type" glass.

The workability of this type of glass material was further improved so as to more readily obtain the above-mentioned glass piece of small rod-type. The composition of this improved glass material comprises 25 weight parts of lithium methaphosphate $LiPO_3$, 25 weight parts of magnesium metaphosphate $Mg(PO_3)_2$, 50 weight parts of aluminum metaphosphate $Al(PO_3_3$ and 8 weight parts of silver metaphosphate. This glass will hereinafter be referred to as "B type" glass.

While A type glass and B type glass have almost the same sensitivity and predose, the workability and the durability against weathering of the latter are far better than the former. More particularly, as already mentioned, the dissolvable quantity of $K^+$of the A type glass is about 50 p.p.m. but that of $Li^+$of the B type glass is only about 3 p.p.m. In addition, owing to its good workability, the B type glass can be readily worked into glass pieces of small rod-type of the dimensions of about 1 mm. diameter and 6 mm. long which are suitable to apply to human bodies over a long period of time.

However, these glass materials are not yet perfect and there are many problems to be solved. Thus, in addition to the desire of further increasing sensitivity, it is also desirable to decrease predose so that even radiations of lower dose could be accurately measured. The phenomenon of fading of the glasses of A or B type is not so large, but it is desirable to produce such glass exhibiting still less fading for use in monitoring over a long period. Further, the A type glass has a large energy dependence, that is the relative response of the glass when it is irradiated by X-rays having the effective energy level of from 30 to 100 Kev. is about 20 times larger than the response when it is irradiated by γ rays of $Co^{60}$ having an effective energy of 1250 Kev. When irradiated upon a substance or a living body, the $Co^{60}$ γ rays of 1250 Kev. would generate secondary γ rays having a lower energy level than that of themselves according to the Compton effect, γ moreover the secondary γ rays, would generate tertiary γrays of further lower energy level. This process may be repeated to emit X-rays of low energy level. This process may be repeated to emit X-rays of low energy level. As a result, in the substance or living body there would be in existence γ rays or X-rays of low energy levels in addition to the primary $Co^{60}$ γ rays. Thus if a glass piece having large energy dependency would be used for the measurement of exposed dose, values larger than actual might be indicated. Thus, it is desirable to obtain glasses of smaller energy dependency. As will be explained later by referring to a graph, the energy dependency of the B type glass has been considerably improved.

It is an object of this invention to provide an improved badge glass for silver-activated phosphate glass predose, having high sensitivity and small predose, and which is free of fading.

A further object of this invention is to provide an improved badge glass for silver-activated phosphate glass dosimeters having a having a small energy dependency.

A still further object of this invention it to provide a badge glass for silver-activated phosphate glass dosimeters having high durability against weathering in addition to the above-mentioned desirable characteristics.

Yet another object of this invention is to provide a badge glass for silver-activated phosphate glass dosimeters having high degree of workability and which are suitable for preparing glass pieces of the small rod-type.

Another object of this invention is to provide a badge glass for silver-activated phosphate glass dosimeters having a high buildup rate and which are suitable for use for military and research purposes.

A further object of this invention is to provide a badge glass for silver-activated phosphate glass dosimeters which is easily manufactured.

In accordance with this invention, the above and other objects can be attained by preparing the glass by melting a mixture, according to a well known conventional method, said mixture comprising 40 to 55 parts by weight of lithium metaphosphate and complementarily, from 60 to 45 parts by weight of aluminum metaphosphate and from 2 to 11 percent by weight of silver metaphosphate based on the combined weight of lithium metaphosphate and aluminum metaphosphate. Where glasses of especially high workability are desired, from 1.5 to 5.0 percent by weight of magnesium metaphosphate or beryllium metaphosphate based on the combined weight of the lithium metaphosphate and aluminum metaphosphate may be added to the above-mentioned mixture. The phosphate material must have the purity of substantially 100 percent metatype compounds.

The features of the invention which are believed to be novel are set forth with particularity in the appended claims. The invention itself, however, as to its organization together with further objects and advantages thereof, may best be understood by reference to the following description taking in connection with the accompanying drawings, in which:

FIG. 3 shown relative response viz effective energy characteristics curves of the novel glasses containing different quantities of $AgPO_3$.

In order to increase the sensitivity of badge glasses for the silver-activated phosphate glass dosimeter, we have performed extensive research on various glass materials, and found that the desired glasses can be attained by using as a base material a mixture of nearly equal quantities of lithium metaphosphate and aluminum metaphosphate instead of employing a mixture of barium metaphosphate and magnesium metaphosphate which have heretofore been used as the base material of the glass of the type referred to above. As a matter or course these mixtures are incorporated with a suitable amount of silver metaphosphate. It is essential that the employed material of each phosphate should be wholly in the form of metaphosphate. Of course, the materials should not contain any of such impurities as copper, iron or the like. In addition, they should have very small ignition loss. That is to say, the content of orthophosphate, pyrophosphate and phosphates of other types should be very small, otherwise the predose would not be decreased and improvements of sensitivity would not be high.

In prior silver-activated phosphate glasses, sufficient considerations regarding the purity of their raw materials have not been paid, so that it was extremely difficult to control the quality of the products. Thus, it has been difficult to constantly manufacture products of consistent quality. Constant and sufficient attention to the purity of the constituents results in the increase of the sensitivity of the glasses produced as well as in the easy control of the production.

The sensitivity of a glass prepared in accordance with this invention by mixing and melting about 50 weight parts of pure $LiPO_3$, about 50 weight parts of pure $Al(PO_3)_3$ and 7 percent of pure $AgPO_3$ was found to be twice or more than the above mentioned prior A type or B type glass.

Figure 1:
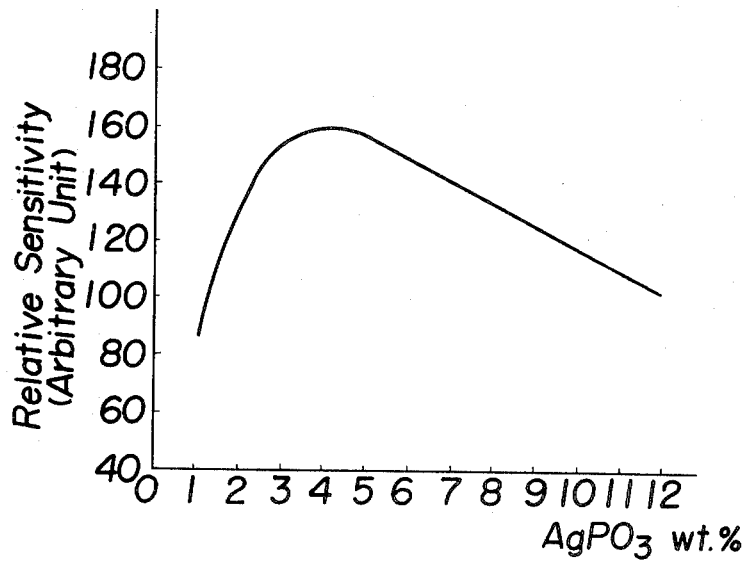
FIG. 1 shows a curve illustrating the relation between the relative sensitivity of the novel glass and the content of $AgPO_3$.
Figure 2:
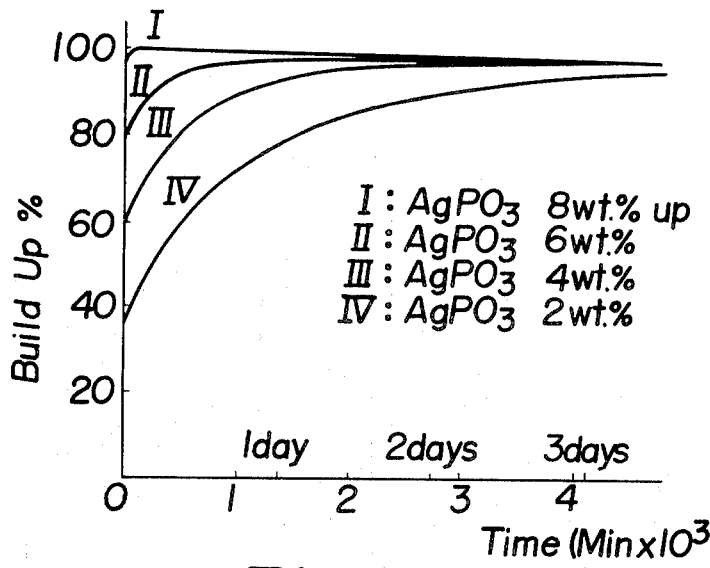
FIG. 2 shows plots of buildup characteristics of the novel glass for different $AgPO_3$ contents.

The sensitivity of the novel silver-activated phosphate glass varies dependent upon its Ag content. As shown in FIG. 1, which illustrates the relation between the relative sensitivity and the content of $AgPO_3$, the maximum sensitivity occurs at $AgPO_3$ content of about 4 percent. However, $AgPO_3$ contents of from 2 percent to 11 percent can be actually used since the sensitivity within this range is satisfactory. It is to be understood that the content of $AgPO_3$ must be suitably selected to attain the desired object by taking into consideration other factors, As shown in FIG. 2, 100 percent buildup times of the glasses differs greatly depending upon the content of $AgPO_3$. In FIG. 2, a curve I shows the buildup of a glass containing more than 8percent of $AgPO_3$ in which case the buildup is compelted in about 5 minutes. Accordingly, as the badge glass for military or civil defense use, a glass containing more than 8percent of $AgPO_3$ is preferable. However, an increase in the $AgPO_3$ content has a tendency to slightly increase the durability for weathering. Nevertheless, the result of the weather durability test mentioned above wherein the dissolvable quantity of $Li^+$ was determined with regard to a glass containing 9percent of $AgPO_3$ showed that the dissolvable quantity of $Li^+$ was approximately 8 p.p.m., which is far smaller than the value of 50 p.p.m. of the prior A type glass. The glasses for military or civil defense use do not need high sensitivity.

For brevity, in the following, a glass according to this invention containing more than 8percent of $AgPO_3$ will be designated as the C type glass, whereas those containing less than 8percent will be designated as the D type glass.

Curve II in FIG. 2 shows the buildup characteristic of a glass containing 6 percent of $AgPO_3$ from which it can be readily noted that it takes about 1 day for buildup. Curves III and IV show buildup characteristics of glasses containing 4 and 2 percent, respectively. The curve III requires about 2 days while curve IV 5 days buildup. It is to be understood that all these buildup curves were determined at a temperature of 25° C.

If, for any reason, a rapid determination is required, the irradiated glasses may be heated to a temperature of from 90° to 110° C. for about 10 minutes, such heating having the effect of completing buildups in all cases in from 5 to 10 minutes regardless of the $AgPO_3$ content. Consequently, for the military or defense outdoor or for indoor investigations, when rapid measurements are desired, it is advantageous to use the glass containing more than 8% of $AgPO_3$. On the other hand, for the personal monitoring or medical use when generally an accumulated exposure dose over a long period of time is to be measured, glasses containing less than 8% of $AgPO_3$ may be advantageously used since there is no trouble in heating or storing the irradiated glasses for one or a few days. The dissolvable quantity of $Li^+$ of the glass containing about 6% of $AgPO_3$ is approximately 5 p.p.m. Its durability against weathering is excellent and its sensitivity is also very high.

It is easy to form badge glasses having a cubic or plate shape with above-mentioned glass materials, and with regard to their workability there is no problem. However, where small rod-type products such as a rod of 1 mm. diameter and 6 mm. long for use in radiology or radiotherapy are produced, there is a tendency of growing devitrification of the glass. We have investigated this problem and found that, when a glass of the composition consisting of 40 to 55 parts by weight of pure lithium metaphosphate and complementarily, 60 to 45 parts by weight of aluminum metaphosphate, 5 to 8% (on the above-mentioned basis) of pure silver metaphosphate and 1.5 to 5% (on the above-mentioned basis) of pure magnesium metaphosphate $Mg(PO_3)_2$ or the same amount of pure beryllium metaphosphate $Be(PO_3)_2$ is used, small rod-type products can be very satisfactorily prepared without devitrification. The durability against weathering of this glass is also excellent with the dissolvable quantity of $Li^+$ of only 4 p.p.m. The sensitivity of this glass was comparable with that of the above-mentioned D type glass. Hereinafter, this glass will be designated as the E type glass.

The value of predose of each of said C, D and E type glasses embodying this invention was from 0.1 to 0.2 R., and is one order of magnitude smaller than the value of 2 R. or 5 R. of the prior A or B type glass. As a result, even the low irradiation, for example, of about 0.01 R which had been extremely difficult to measure with conventional badge glasses, can be measured with a high accuracy with badges made of the novel glass. This is a remarkable advance in the art.

Another noteworthy advantage of the novel glass is its low energy dependency. FIG. 3 shows a group of curves to illustrate the comparison of energy dependency of the novel glasses and that of the prior glasses, wherein the curves A, B and C represent respectively the relative responses of the prior types A and B and type C of this invention, the curve D represents that of type D and E of this invention and the curve D' represents that of type D of this invention which contains a smaller amount of $AgPO_3$. The contents of $AgPO_3$ for respective glasses are also shown in FIG. 3. As can be clearly noted from FIG. 3, when the prior A type glass is irradiated by X-rays of the effective energy level of from 30 to 100 Kev., it will exhibit a relative response which is about 20 times larger than that when irradiated by $Co^{60}$ γ rays of 1250 Kev. However, with the novel glasses of this invention, these relative responses between 30 and 100 Kev. are only several times larger than that of 1250 Kev. This is extremely advantageous for the measurement of radiations having a wide range of effective energy.

Another noteworthy advantage of the novel glass is that there is no appreciable phenomenon of fading. The phenomenon of fading may be defined as that wherein a curve I in FIG. 2 decays with time. However, in the case of the novel glass, as represented by the curve I, it is substantially horizontal and shows almost no tendency of decay with time. Although not shown in the figures, in case of the prior A type glass the fading is about twice as large as with the novel glasses.

As already pointed out it is essential to increase the purity of each phosphate material. With regard to other impurities that may be introduced by other causes, $Al_2O_3$ or $SiO_2$ is frequently introduced into molten glass from the glass pot made of alumina or silica which is utilized to melt the glass. In such a case $SiO_2$ or $Al_2O_3$ of less than 5 percent by weight does not result in difficulty melting the glass, nor does it affect above-mentioned beneficial characteristics of the novel glass. Incorporation of less than 5% by weight of pure magnesium metaphosphate to the novel glass component does not result in a decrease of the sensitivity of the novel glass of other than the E type glass. In addition, the incorporation of the 5% of pure magnesium metaphosphate improves the durability against weathering without increasing predose.

In the glasses embodying this invention, since pure metatype phosphates are employed as the raw material it becomes easy to control the melting operation. Further, by maintaining constant the proportion of the ingredients and the melting temperature according to the application, it becomes possible to produce in large quantities products of uniform quality which are suitable for the particular application. Since the yield of the products is greatly improved, the products can be prepared more economically. Melting temperatures of from 1100° to 1150° C. are suitable, but when 1200° C. is exceeded, the phosphates begin to decompose and vaporize, thus departing from the required metatype and the resulting glass tends to increase.

The present invention will be more fully understood by reference to the following specific examples, given by way of illustration and not as a limitation to the scope of the invention. All parts are by weight.

Example 1

Seven hundred grams of a mixture comprising 47.0 parts of pure lithium metaphosphate, 53.0 parts of pure aluminum metaphosphate and 6.0 parts of pure silver metaphosphate was put into a pure alumina pot. The pot was then heated to a temperature between 1100° and 1150° C. in an electric furnace provided with a heating element made of a sintered mass of silicon carbide powder, whereby the mixture was melted and agitated with a rod of pure alumina to obtain a glass mass.

This glass was molded into a cubic-type badge glass piece of the dimensions 8 mm.×8 mm.×4.7 mm. The predose of the glass piece was 0.10 R. and even a small exposure dose of about 0.01 R. could be accurately measured with this glass piece. By the aforementioned test method it was found that the dissolvable quantity of $Li^+$ of this glass was 5 p.p.m. After maintaining the badge glass piece of this example at a relative humidity of from 70 to 100% and at a temperature of 30° C. for 3 months, no surface abnormity was noted and the fading was only 2%. The sensitivity of this glass was about 3 times higher than that of the conventional B type glass mentioned above.

Example 2

By the same procedure as in Example 1 a mixture consisting of 45.4 parts of pure lithium metaphosphate, 54.6 parts of pure aluminum metaphosphate and 9.3 parts of pure silver metaphosphate was melted to obtain a glass mass.

This glass was molded into cubic type badge glass pieces having dimensions of 8 mm.×8 mm.×4.7 mm. As in Example 1 the predose of these glass pieces was 0.10 R. The glass pieces were subjected to the irradiation of γ rays of the intensity of about 1 R. and radiated from $Co^{60}$, and then stimulated by ultraviolet rays. The fluorescence resulting from the ultraviolet ray stimulation reached saturation within only 5 minutes. The dissolvable quantity of $Li^+$ of this glass was 8 p.p.m. Like Example 1, after standing in an atmosphere having a relative humidity of from 70 to 100% and a temperature of 30° C. for 3 months, there was noted no abnormality on the surface of the glass. The fading of the glass was only about 3% after 6 months and the sensitivity of this glass was about 2.5 times higher than that of the conventional B type glass.

Example 3

By the same procedure as in Example 1 a mixture consisting of 48.5 parts of pure lithium metaphosphate, 51.5 parts of pure aluminum metaphosphate, 6.1 parts of pure silver metaphosphate and 2.8 parts of pure magnesium metaphosphate was melted to obtain a glass mass.

This glass could be readily molded without devitrification into small rod-type badge glass pieces of 1.0 mm. diameter and 6.0 mm. long. The predose of these glass pieces was 0.15 R and the dissolvable quantity of $Li^+$ thereof was 4 p.p.m. The result of a test in an atmosphere having a relative humidity of 70 to 100% was identical to that of Example 2. The fading was about 1% after 6 months, and the sensitivity of these glass pieces was about 3 times higher than that of the B type glass.

Example 4

By the same procedure as in Example 1 a mixture consisting of 47.3 parts of pure lithium metaphosphate, 52.7 parts of pure aluminum metaphosphate, 6.3 parts of pure silver metaphosphate and 5.4 parts of pure beryllium metaphosphate was melted to obtain a glass mass.

The glass was readily molded into small rod-type badge glass pieces identical to those described in connection with Example 3. Their durability against weathering, fading grade and sensitivity were comparable to those of Example 3.

What is claimed is:

1. A glass material comprising a melted and solidified mixture consisting essentially of
    from 40 to 55 parts by weight of lithium metaphosphate,
    from 60 to 45 parts by weight of aluminum metaphosphate,
    from 2 to 11% by weight of silver metaphosphate based upon the combined weight of said lithium metaphosphate and aluminum metaphosphate, and
    up to about 5% by weight of $SiO_2$ or $Al_2O_3$.

2. A glass material as claimed in claim 1 wherein the quantity of silver metaphosphate is from 2 to 8%.

3. A glass material as claimed in claim 1 wherein the quantity of silver metaphosphate is from 8 to 11%.

4. A glass material as claimed in claim 2 containing from 1.5 to 5.0% of beryllium metaphosphate based on the combined weight of lithium metaphosphate and aluminum metaphosphate.

5. A glass material as claimed in claim 2 containing from 1.5 to 5.0% of magnesium metaphosphate based on the combined weight of lithium metaphosphate and aluminum metaphosphate.

6. A glass material as claimed in claim 1 free of $SiO_2$ and $Al_2O_3$.